Oct. 28, 1969   C. W. BOWEN, JR., ET AL   3,474,819
AUTOMATIC CONTROL FOR HYDRAULIC SYSTEMS
Filed March 1, 1967

United States Patent Office 3,474,819
Patented Oct. 28, 1969

3,474,819
AUTOMATIC CONTROL FOR HYDRAULIC SYSTEMS
Charles W. Bowen, Jr., and William R. Stapper, Arlington, Tex., assignors to Bell Aerospace Corporation, a corporation of Delaware
Filed Mar. 1, 1967, Ser. No. 619,740
Int. Cl. F16k *17/18, 49/00*
U.S. Cl. 137—334          7 Claims

ABSTRACT OF THE DISCLOSURE

Momentum of a normally confined stream of fluid, issuing from a vehicle component having a circulating pump outlet in its travel to a treating unit, is balanced against the momentum of the stream returning to the component and upon imbalance, the stream is diverted from the treating unit directly to the component.

FIELD OF THE INVENTION

This invention relates to hydraulic systems such as employed on vehicles, aircraft, ships, missiles, etc., and more specifically to sensing, controlling and maintaining flow of vital fluid. In a more specific aspect, the invention relates to a flow controller responsive to imbalance between momentum at two critical points in a normally confined fluid stream which will sense and isolate leaks occurring between such points.

PRIOR ART

In according protection to vital elements subject to failure in operation or subject to damage in combat such as characterizes operations of military aircraft, for example, the use or armor plate and minimization of the silhouette of the vital components have been employed. However, in the protection of hydraulic systems where flowlines must extend substantial distances because of the requirements of the vehicle in its operation, armor plating does not provide an answer. In many instances, the configuration of the system cannot be changed to minimize the area of exposure and yet maintain normal operations.

THE INVENTION

In accordance with the present invention, as applied to protection of a transmission of a helicopter where a circulating pump maintains circulation of transmission fluid to and from a fluid treating unit, a control valve is employed to prevent loss of the fluid. A valve input port is connected to the output of the pump. An output port leads to the transmission and is associated with means to balance the momentum of flow leaving the pump with momentum of flow returning to the transmission for normally directing fluid to the cooling unit. Means are provided responsive to momentum imbalance for bypassing the treating unit and returning flow directly to the transmission.

In a more specific aspect, a valve is provided having a pair of opposed chambers in each of which there is provided a momentum-responsive piston. A slidable nozzle cooperates with each piston for directing flow onto the face of the pistons. Resilient means biases one of the pistons to control valve sensitivity to momentum imbalance. A valve member positioned between the pistons and positioned thereby normally directs flow from an input port to a first output port, but upon imbalance abruptly moves to switch flow to bypass the first output port to direct flow to a second output port.

THE DRAWINGS

Figure 1:
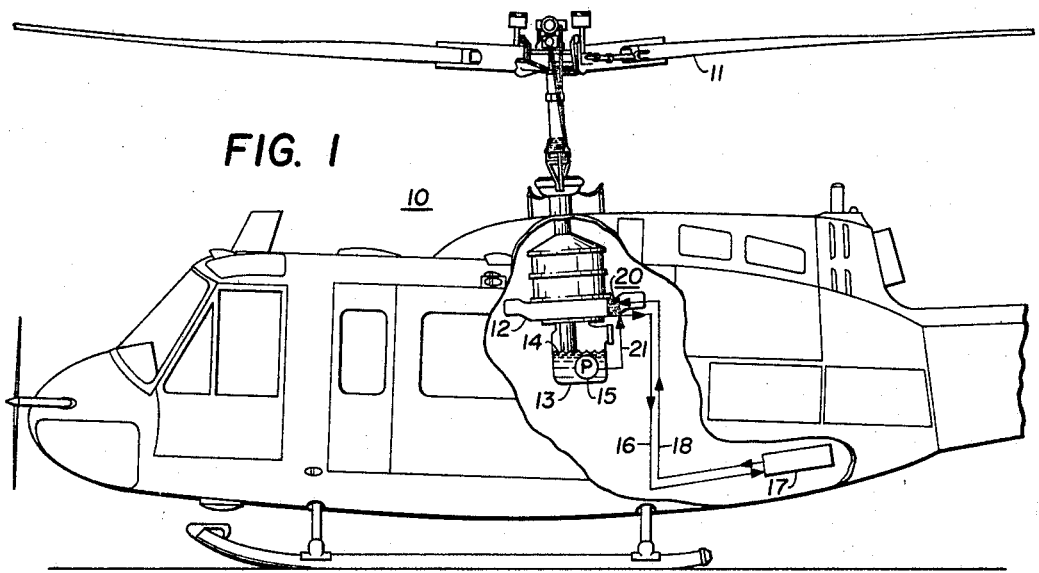
Figure 2:
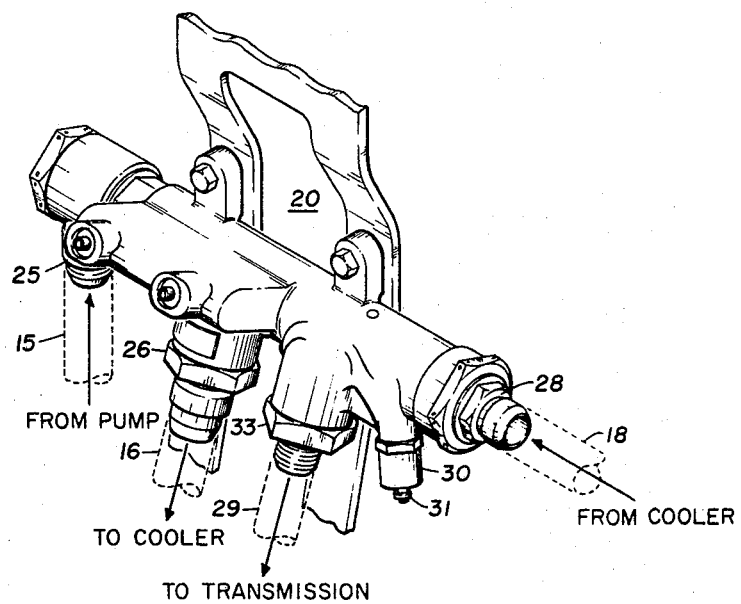
Figure 3:
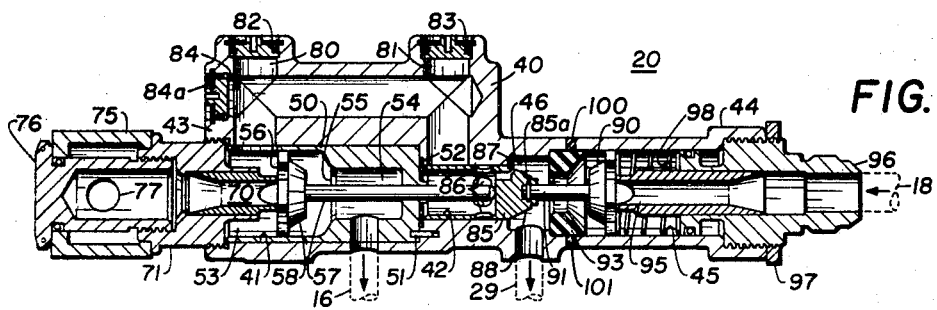
Figure 4:
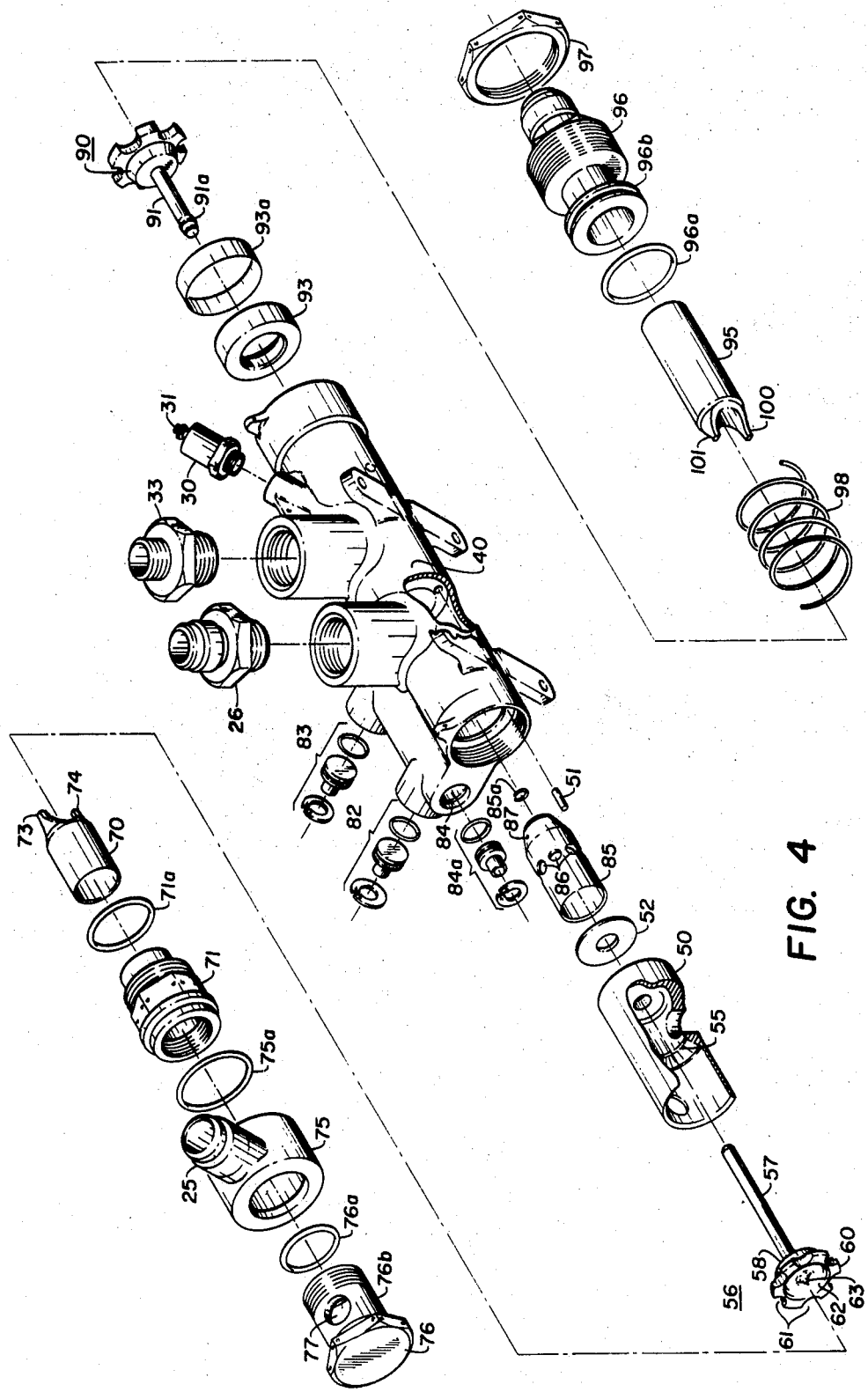

FIGURE 1 is a schematic diagram of a helicopter and one vital fluid system;
FIGURE 2 is a perspective view of the valve unit of FIGURE 1;
FIGURE 3 is a sectional view of the valve unit of FIGURE 2; and
FIGURE 4 is an exploded view of the valve unit of FIGURES 2 and 3.

THE PREFERRED EMBODIMENTS

In FIGURE 1 a helicopter 10 has been illustrated partially broken away in order to show a transmission 12 and associated components. As is well known, a rotor system 11 is driven by way of transmission 12. Transmission 12 in the power train leading to rotor 11 is a critical component. As is generally understood, a suitable quantity of oil is maintained in transmission 12. An oil sump 13 is located below the transmission 12 where oil pumped through the transmission 12 is collected. A pump 15 in the bottom of the sump 13 is employed to recirculate the oil through the transmission 12. Normally the output of the pump 15 flows by way of line 16 through a transmission oil cooler 17. A return line 18 leads back to transmission 12. The cooler 17 generally is spaced from the transmission 12 and is mounted at a location dictated by engineering and design considerations involving the total helicopter's system.

The cooling system is vulnerable particularly where the craft 10 is involved in military operations. The transmission oil will rapidly be lost, on rupture of lines 16 and 18 or upon damage, by antiaircraft fire, to the cooler 17. When this occurs, the craft will be operative only for a relatively short period. In one craft currently in operation, the transmission 12 has been found to be capable of operation for only five minutes or so following loss of the transmission oil. As above noted, an obvious solution to eliminate this vulnerability would be to provide armor for the lines 16, 18 and cooler 17. However, weight limitations are of primary concern so that the addition of armor plate is to be avoided, if possible.

It has been found that the transmission 12 will operate for an extended period without failure or appreciable damage as long as transmission oil is present, even though the temperature thereof becomes substantially elevated. By way of example, where the cooler 17 is operative, transmission oil temperature normally is about 170°–180° F. Under extreme hot weather conditions, the oil temperature may rise to about 230° F. Such operation may be maintained for extended periods without damage to the transmission. In such operation, the oil deteriorates and requires early replacement but damage to the transmission is avoided.

By the present invention, a valve normally routes transmission oil to the oil cooler 17 and bypasses the oil cooler and lines leading thereto upon rupture or leakage therein.

The invention provides not only for rapid response to massive leaks but also response to relatively minor leaks which, if not detected, would result in total loss of oil. In a representative system, pump 15 operates to move the transmission oil at the rate of 12 gallons per minute. In such system, rupture of the transmission oil cooler circuit will cause loss of the entire store of transmission oil in a period 10 to 15 seconds.

In accordance with the present invention, a momentum balance bypass valve is employed for sensing leakage in the cooler circuit and for bypassing the cooler circuit to prevent any appreciable loss of transmission oil upon the occurrence of leakage, either massive or minute.

A bypass valve 20, FIGURE 1, is located adjacent to the transmission 12 and has input line 21 and lines 16 and 18 leading thereto. One embodiment of valve 20 is shown in detail in FIGURES 2–4. Valve 20 is connected to the pump output line 15 by way of fitting 25. It is connected to cooler line 16 by way of fitting 26. It is connected to return line 18 by way of fitting 28. Line 29 leads from the valve 20 directly to the transmission 12 by way of fitting 33.

Valve 20 is provided with a pressure sensing element 30 having an output terminal 31. The element 30 in the form of a pressure switch which is normally closed but which opens to energize a warning light in the pilot cockpit when the valve is actuated to bypass the cooler 17.

FIGURE 3 is a sectional view of valve 20. A main valve body 40 is provided with a reentrant bore at the left end 43 forming a major cylindrical chamber 41 and a minor cylindrical chamber 42. Chambers 41 and 42 are coaxial. A reentrant cylindrical bore in body 40 from the right end 44 forms a major chamber 45 and a minor chamber 46. Chambers 45 and 46 similarly are coaxial with chambers 41 and 42, with chamber 42 communicating with chamber 46.

A hollow cylindrical insert 50 is positioned in chamber 41. It is keyed, as to prevent rotation in chamber 41, by a pin 51. A sealing washer 52, a thin, relatively soft, resilient washer, is positioned between the end of the insert 50 and the end of chamber 41.

The insert 50 has a reentrant bore with a large diameter section 53 and a smaller diameter section 54. The transition between sections 53 and 54 is machined as to form an annular valve seat 55.

An inlet piston 56 is mounted in section 53. Piston 56 is provided with a cylindrical stem 57 which extends through a port in the end of the insert 50. The piston 56 has a short, truncated, conical body 58 which will mate with the valve seat 55.

As best shown in FIGURE 4, piston 56 also includes an annular disc 60, integral with body 58, which has peripheral arcuate slots 61 therein. It also has a dished face 62 with a central flow forming peak or tip 63. The disc 60 is of diameter slightly smaller than the inside diameter of section 53 so that the piston is slidable toward and away from the seat 55.

A slidable nozzle 70 is mounted in a nozzle holder 71. The nozzle holder 71 is threaded into the end of the body 40 to close the chamber 41 and section 53 and to seat insert 50 in the chamber 41.

As best shown in FIGURE 4, the nozzle 70 is hollow and has a pair of legs 73 and 74. The legs 73 and 74 bear against the dished face 62 of the piston 56 and serve the purpose of accurately positioning the point of emergence of the fluid from nozzle 70 relative to the point of impingement against dished face 62. The nozzle 70 is slidable in the holder 71. It is shaped internally as to direct the incoming fluid with increased velocity onto the dished face 62.

The inlet fitting 25 is integrally formed with a short cylinder 75. The cylinder 75 is mounted on the end of the nozzle support 71 by a cap 76. Cap 76 has a lateral port 77 therein which permits fluid entering fitting 25 to flow to nozzle 70.

The body 40 is provided a bypass channel which includes bores 80 and 81, FIGURE 3, closed by caps 82 and 83, respectively. The bypass channel is completed by a third bore 84 which is closed by cap 84a. The bore bore 80 communicates with the section 53 inside the insert 50. The bore 84 interconnects bores 80 and 81. The bore 81 communicates with the chamber 42.

Under normal operation, the bypass channel is closed by a slidable valve member 85. The valve member 85 is cylindrical, open at the left end and closed at the right end. It has a plurality of ports 86 therein. It also is provided with a leak passage 87. Leak passage 87 leads to chamber 46 from which line 29 extends to the transmission 12. Valve member 85 also has a conical tip 88.

A return piston 90 is mounted in chamber 45 and is of the same general shape as inlet piston 56 except that the shaft 91 is relatively short. The shaft 91 registers with a cylindrical well in the conical end 88 of the element 85 and is retained by a snap ring 85a, FIGURE 4, which snaps into groove 91a. A valve seat 93 is secured in the end of the chamber 45. The shaft 91 extends through the valve seat 93.

A slidable nozzle 95 is mounted in closure member 96. Closure member 96 is threaded into the end 44 of the body 40 and is provided with a locking nut 97. A helical spring 98 is positioned between the inner end of the closure 96 and the face of the return piston 90. The nozzle 95 is formed with two legs 100 and 101 which serve the same purpose as their counterparts, legs 73 and 74, that of accurately positioning the point of emergence of the fluid from nozzle 70 relative to the point of impingement against the dished face 62. The legs bear against a dished face of the return piston 90. The force exerted by spring 98 on the piston 90 is adjusted to select the threshold of the differential in momentums at which the valve will be actuated.

The system operates to balance the momentum of the stream of transmission oil impinging the dished face of the input piston 56 against the momentum of the stream of oil returning from the cooler and impinging the dished face of the return piston 90. When the momentum of the inlet stream exceeds the sum of the forces represented by the pressure of spring 98 and the momentum of the return stream, then the valve system, including member 85, moves to the right. After only slight movement, the cylindrical end of the member 85 is unseated from contact with washer 52. When this occurs, the pressure of the oil in the bypass bores 80, 81 and 84 is then effective on the inside of the valve member 85 to cause the entire system to be abruptly actuated to force the conical end 88 of the valve member 85 onto valve seat 93. Before member 85 mates with seat 93, the portion 58 of inlet piston 56 contacts valve seat 55 to assure abrupt termination of flow through line 16 and thereby force all flow from nozzle 70, passing by way of the bores 80, 81, 84, into the valve member 85, and then through the ports 86 to transmission input line 29.

The invention, as above described, is applied to the protection of the transmission oil supply in a helicopter transmission. It will be appreciated that the same valve system may be employed in other aircraft hydraulic systems, to hydraulic systems on tanks, sea vessels, missiles, and the like, or on stationary systems when failure of a portion of a hydraulic system may be sensed to isolate such portion and maintain the remainder in operation. Thus, it is not intended that the present invention be limited to the particular form of valve nor to the particular installation locale. However, the form of valve illustrated in FIGURES 2–4 represents a preferred embodiment.

In FIGURE 4 it will be understood that suitable means are employed to make the valve liquid tight. Gaskets or O-rings, such as O-ring 76a, will fit in groove 76b to provide a seal at one end of the cylinder 75. A gasket 75a seals the other end of cylinder 75 relative to the nozzle mounting unit 71. O-ring 71a provides for sealing the element 71 in the end of the body 40. Similarly, O-ring 96a in groove 96b provides a seal between the adjustable insert 96 and the walls of the chamber 45.

The valve seat 93 is formed of a suitable plastic material. Since the member 85 was manufactured of aluminum, a relatively soft metal, and as it moves with extremely high velocity, a seat therefor of somewhat resilient material is desirable to reduce wear of the part. There are many plastic materials suitable for this purpose. In one embodiment, it was made of a resilient material, such as manufactured and sold by Polymer Corporation and designated as Nylatron G.S., a solid formed of nylon granules and fibrous molybdenum disulphide. This material has been found to be suitable. Of course, if the member 85 were to be manufactured of a material harder than aluminum, such as steel, then the use of resilient material for the valve seat 93 might not be required or desirable.

The valve seat 93 was affixed in the bottom of recess 45 by a suitable adhesive, an epoxy cement. For mounting the seat 93, an input port 100 was provided along with a drain port 101. With the valve seat 93 fixed in position in the end of the chamber 45, a liquid adhesive was introduced through port 100. The adhesive then formed an annular ring 93a. When the resin began to issue from drain port 101, port 101 was closed. The adhesive was then allowed to set firmly to seat the element 93 in position.

The ring or washer 52, in one embodiment, was an elastomeric body such that it would not swell or otherwise deteriorate in the presence of the transmission oil. A Dow-Corning silicone elastomer was used. The element must be compatible with the oil and provide a seal for the end of the member 85. In operation, the spring is adjusted to select the threshold at which the valve will be actuated. By threshold is meant that rate of loss of oil at which the difference in momentum of the oil impinging on opposite sides of the valve will, as hereinbefore described, actuate the valve so as to cause the fluid to bypass the cooling or treating system.

In the system where the pump moved the transmission oil at the rate of 12 gallons per minute, the nozzle 70 was formed to provide a velocity of about 500 inches per second. The spring was then adjusted for a threshold of 0.9 gallon per minute. With a pressure differential representative of this difference in momentum, the valve would then be actuated to bypass the cooling or treating system. The spring may be set for a threshold as low as 0.1 gallon per minute. A setting at this low threshold would permit the system to detect very small leaks but would make it so sensitive as to cause it to react, or be actuated by, changes in the oil temperature. That is, with a threshold of 0.1 gallon per minute, the increased difference in the momentum of the impinging oil, resulting from the increased friction of the oil at lower temperatures, might actuate the valve and unnecessarily cause a bypassing of the cooling system.

It will be appreciated that the spring system may include the use of a bi-metallic washer in series with the spring 98 so that the system would be operable over a very wide range of temperatures including temperatures below zero.

What is claimed is:

1. A momentum balance valve for switching flow of a first fluid stream upon imbalance of predetermined magnitude between the momentum of said first stream and the momentum of a second fluid stream which comprises:
   (a) a body having an input chamber for receiving said first stream with a first output port, a return chamber for receiving said second stream with a second output port, and a valve chamber aligned with both said input chamber and said return chamber,
   (b) bypass structure forming a bypass channel leading from said input chamber to said valve chamber,
   (c) a valve member having an open end, a closed end and lateral ports and normally positioned in said valve chamber to close said bypass channel and said lateral ports,
   (d) a first piston mounted in said input chamber and adapted to engage said valve member,
   (e) first seat structure in said input chamber past which said first stream must flow to reach said first output port and adapted to seat said first piston but normally spaced from said first piston for flow through said first chamber past said first piston and said first seat structure to said first output port,
   (f) a second piston in said return chamber resiliently biased toward said valve member and adapted to engage said valve member opposite said first piston,
   (g) second seat structure in said return chamber to receive said closed end of said valve member but normally spaced from said closed end for flow through said return chamber past said second piston and said second seat structure to said second output port, and
   (h) nozzle means in each of said input chamber and said output chamber for directing fluid to impinge upon opposed faces of said first and second pistons thereby to develop opposed momentum-dependent forces on said valve member.

2. The system of claim 1 wherein each said nozzle means is movable relative to said body to maintain contact with one of said pistons for uniform control of said streams as they impinge said pistons while permitting movement of said pistons and said valve member.

3. The system of claim 1 wherein adjustable means in said return chamber provide for variation in the resilient bias applied to said second piston to control the threshold imbalance and at which said flow is switched.

4. The combination set forth in claim 1 wherein the lengths of said pistons and said valve member and the spacings between said seat structures are such that said first piston seats on said first seat structure before said valve member seats on said second seat structure.

5. The combination set forth in claim 1 wherein said first seat structure is rigid and said second seat structure is resilient.

6. A flow control valve responsive to a predetermined imbalance between the momentum of a first flow stream and the momentum of a second flow stream for directing the first stream from a first path to a second path comprising:
   (a) a housing,
   (b) means for channeling the first flow stream through said housing along the first path,
   (c) means for channeling the second flow stream through said housing along the second path,
   (d) a bypass channel for diverting the first flow stream through said housing from the first path through the second path,
   (e) means responsive to predetermined imbalance between the momentum of the first stream and the momentum of the second stream to close off the first stream from along the first path, and
   (f) a valve means engaging said responsive means normally closing off said bypass channel when the momentum difference between the first and second streams is less than the predetermined imbalance, and moveable from the normally closed position initially by said responsive means and then abruptly by the momentum of flow of the first stream through said bypass channel to a position for closing off the second stream from along the second path and diverting the first stream through the bypass channel and along the second path.

7. In a hydraulic system where a pump normally maintains circulation of transmission oil in a flow path which includes a cooler system and a power transmission, the combination which comprises:
   (a) a valve having an input port flow-connected to receive the output of said pump, a return port flow-connected to a return line from said cooler, a first output port flow-connected to a line leading to said cooler and a second output port leading to said transmission,
   (b) said valve having an input chamber and a return chamber axially spaced apart and flow-connected by a coaxial valve chamber,
   (c) a bypass channel leading from said input chamber to said valve chamber, (d) a first piston mounted in said input chamber,
(e) a second piston mounted in said return chamber in an opposed position to said first piston,
(f) means for directing flow from said input port onto the face of said first piston to urge said first piston toward said return chamber,
(g) means for directing flow from said return port onto the face of said second piston for opposing movement of said first piston toward said return chamber,
(h) a valve member in said valve chamber normally closing said bypass channel and coupled to said first and second pistons, said valve member having normally closed ports which are initially opened upon movement of said first piston toward said return chamber and then moved abruptly by the momentum of flow through said bypass channel to a position for closing off the return port to direct flow from the input port to the second output port, and
(i) structure in said input chamber for engaging said first piston to terminate flow through said first output port wherein flow to said valve member is initiated.

References Cited

UNITED STATES PATENTS

| | | |
|---|---|---|
| 2,720,282 | 10/1955 | Teague et al. |
| 2,796,075 | 6/1957 | Focht _____ 184—60 XR |
| 2,829,669 | 4/1958 | Luzynski _____ 137—334 XR |
| 2,831,554 | 4/1958 | Reynolds ____ 137—596.15 XR |
| 3,286,791 | 11/1966 | Cofer et al. ___ 137—334 XR |
| 3,300,255 | 1/1967 | Racki _____ 137—596.18 XR |
| 3,386,463 | 6/1968 | Flick et al. ___ 137—625.66 XR |
| 2,679,861 | 6/1954 | Campbell ___ 137—614.17 XR |

SAMUEL SCOTT, Primary Examiner

U.S. Cl. X.R.

184—6